(12) United States Patent
Madapushi

(10) Patent No.: US 10,965,906 B2
(45) Date of Patent: Mar. 30, 2021

(54) DYNAMIC RATE ADAPTATION ACROSS MULTIPLE VIDEO SOURCES

(71) Applicant: Vega Systems, Inc., San Jose, CA (US)

(72) Inventor: Thejaswi Bharadwaj Madapushi, San Jose, CA (US)

(73) Assignee: Vega Systems, Inc., San Jose, CA (US)

( * ) Notice: Subject to any disclaimer, the term of this patent is extended or adjusted under 35 U.S.C. 154(b) by 46 days.

(21) Appl. No.: 16/416,153

(22) Filed: May 18, 2019

(65) Prior Publication Data

US 2020/0053314 A1 Feb. 13, 2020

Related U.S. Application Data

(60) Provisional application No. 62/715,309, filed on Aug. 7, 2018, provisional application No. 62/729,843, filed on Sep. 11, 2018.

(51) Int. Cl.
| | |
|---|---|
| *H04N 7/18* | (2006.01) |
| *H04N 7/12* | (2006.01) |
| *H04N 7/08* | (2006.01) |
| *H04N 19/176* | (2014.01) |
| *H04N 19/103* | (2014.01) |

(52) U.S. Cl.
CPC ............ *H04N 7/12* (2013.01); *H04N 7/0806* (2013.01); *H04N 7/181* (2013.01); *H04N 19/103* (2014.11); *H04N 19/176* (2014.11)

(58) Field of Classification Search
CPC ...... H04N 7/12; H04N 19/103; H04N 19/176; H04N 7/0806; H04N 7/181
USPC ............. 348/159, 563; 370/465; 375/240.16
See application file for complete search history.

(56) References Cited

U.S. PATENT DOCUMENTS

| | | | |
|---|---|---|---|
| 6,510,553 B1* | 1/2003 | Hazra | H04N 5/45 348/563 |
| 7,784,076 B2* | 8/2010 | Demircin | H04N 19/172 370/465 |
| 9,544,602 B2* | 1/2017 | Demircin | H04N 21/2365 |
| 2010/0008421 A1* | 1/2010 | Gutman | H04N 21/234309 375/240.16 |
| 2019/0089996 A1* | 3/2019 | Surcouf | H04N 21/2187 |

\* cited by examiner

*Primary Examiner* — Jayanti K Patel
*Assistant Examiner* — Richard B Carter
(74) *Attorney, Agent, or Firm* — Brett A. Schenck

(57) ABSTRACT

A computer-implemented method is provided and includes by at least one processor, obtaining an available bandwidth on the network communications link over a predetermined period of time in the future based on a measured present bandwidth and historical bandwidth measurements, determining required bandwidths for each of one or more of video sources over the predetermined period of time in the future, partitioning the calculated available bandwidth among the one or more video sources in proportion to the required bandwidths of each of the one or more video sources, and selecting one or more of a plurality of video streams from each of the one or more video sources based on a partition assigned to each of the one or more video sources. The selecting of the one or more video streams causes the one or more video streams to be transmitted over the network communications link.

15 Claims, 11 Drawing Sheets

DYNAMIC RATE ADAPTATION ACROSS
MULTIPLE VIDEO SOURCES

CROSS-REFERENCE TO RELATED APPLICATIONS

This application claims priority to U.S. Provisional Application No. 62/715,309, filed Aug. 7, 2018, and U.S. Provisional Application No. 62/729,843, filed Sep. 11, 2018, the disclosures of which are incorporated herein by reference.

FIELD

Embodiments generally relate to data communications, and in particular to video surveillance installations with multiple video sources sharing a common network uplink.

BACKGROUND

An enterprise video surveillance installation may contain anywhere from one to thousands of cameras at a site. Resolution and encoding capabilities of cameras are in many cases heterogenous. For example, each camera may encode video at a different resolution and using different encoding formats. Many encoding formats perform compression, which typically causes portions of a video to be of different size than other portions, depending on scene complexity. The heterogenous and unpredictable scene complexity of video surveillance cameras leads to different network bitrate requirements per camera. The required bitrate changes with time, due to changes in scene activity, changes in user preferences, etc. The variable bitrate requirements in settings like these presents problems for cloud services providers. Available uplink bitrate from a site to the cloud is a key factor that determines successful adoption of cloud storage. However, the available uplink bitrate from a site to a cloud system varies with time, due to varying network congestion, the uplink being shared by other applications and users, variable network traffic, among others. Thus, the time-varying bitrate needed by a video source site is mismatched with the time varying bitrate available to the site. This causes video loss, high latency and customer dissatisfaction.

SUMMARY

In one aspect of the present invention, a computer-implemented method is provided and includes, by at least one processor, obtaining an available bandwidth on the network communications link over a predetermined period of time in the future based on a measured present bandwidth and historical bandwidth measurements, determining required bandwidths for each of one or more of video sources over the predetermined period of time in the future, partitioning the calculated available bandwidth among the one or more video sources in proportion to the required bandwidths of each of the one or more video sources, and assigning an individual set of encoder parameters to each of the one or more video sources based on a partition assigned to each of the one or more video sources. The assigning of the encoder parameters causes data from each of the one or more video sources to be transmitted over the network communications link using the assigned set of encoder parameters.

In another aspect of the present invention, a computer-implemented method is provided and includes by at least one processor, obtaining an available bandwidth on the network communications link over a predetermined period of time in the future based on a measured present bandwidth and historical bandwidth measurements, determining required bandwidths for each of one or more of video sources over the predetermined period of time in the future, partitioning the calculated available bandwidth among the one or more video sources in proportion to the required bandwidths of each of the one or more video sources, and selecting one or more of a plurality of video streams from each of the one or more video sources based on a partition assigned to each of the one or more video sources. The selecting of the one or more video streams causes the one or more video streams to be transmitted over the network communications link.

Still other benefits and advantages of the invention will become apparent to those skilled in the art of photography upon reading and understanding of the details of invention.

Other aspects of the disclosed invention will become apparent from the following detailed description, the accompanying drawings and the appended claims.

DETAILED DESCRIPTION

Provided herein are system, method and/or computer program product embodiments, and/or combinations and sub-combinations thereof, for adapting the bitrate needed by a system with one or more video sources to the communications uplink bitrate available to the system, while simultaneously enhancing the quality of video sent over the link.

While the embodiments described herein are exemplified in the context of a video surveillance system, they are generally applicable to any networking system with heterogenous data sources. Video surveillance installations may include multiple video sources (e.g., cameras, storage, software sources, etc.) that share a common internet uplink. Embodiments find a way to provide fair allocation of available uplink bits across sources. Given a bitrate allocation for a video source, embodiments provide ways for the source to simultaneously maximize bandwidth usage and improve video quality.

Figure 1A:
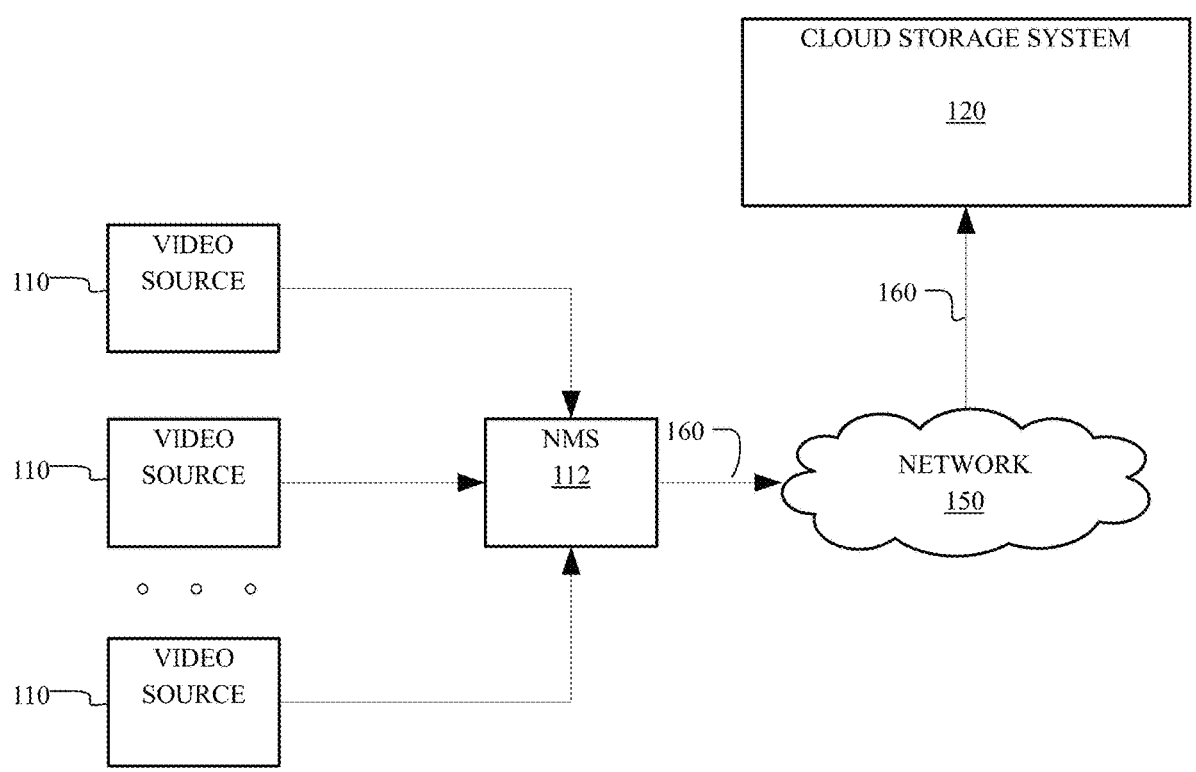
FIG. 1A is a block diagram illustrating a networked video-surveillance with cloud storage environment according to an embodiment of the invention.

FIG. 1A illustrates a networked video-surveillance with cloud storage environment 100, according to an example embodiment. One or more video sources 110 may transmit a video stream to a cloud storage system 120 through an uplink network connection 160 traversing a network 150. The network 150 may be any communications network suitable for transmitting data between computing devices, such as, by way of example, a Local Area Network (LAN), a Wide Area Network (WAN), Metropolitan Area Network (MAN), Personal Area Network (PAN), the Internet, wireless networks, satellite networks, overlay networks, or any combination thereof. Video sources 110 may be any combination of software and/or hardware suitable for transmitting a video stream, such as, by way of example, a video camera (e.g., security camera), storage media, video streaming software application or device, etc. In particular embodiments, a single device may generate and/or transmit multiple video streams, with each video stream comprising a separate video source 110. In particular embodiments, a video source 110 may be an intermediate source providing the video stream from camera. Such as, for example, a Video Management Software.

In particular embodiments, environment 100 further includes a network management system 112. Network management system 112 may comprise any combination of software and hardware suitable to provide network management services as described herein, such as, by way of example, server computers, routers, gateways, switches, bridges, or any combination thereof. In particular, network management system 112 may perform some or all of rate adaptation, uplink bandwidth measurement, and video source bandwidth allocation operations that are described throughout this disclosure.

Figure 1B:
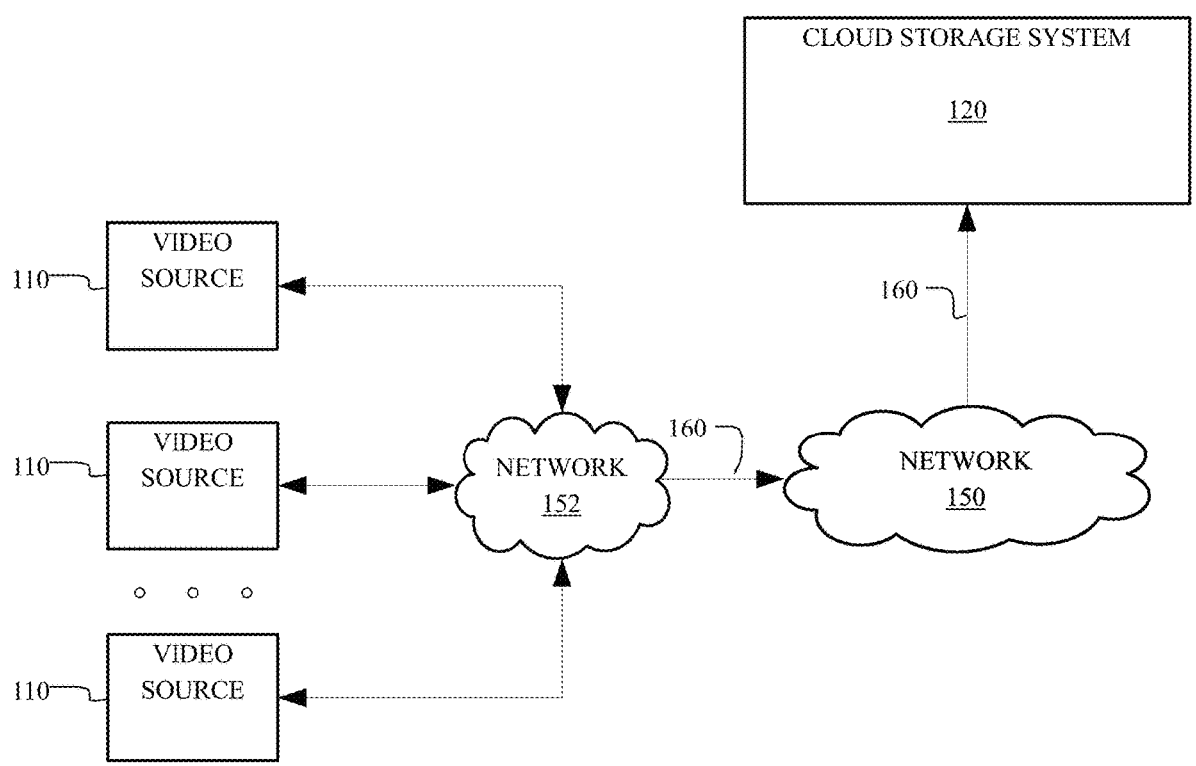
FIG. 1B a block diagram illustrating a networked video-surveillance with cloud storage environment according to another embodiment of the invention.

In particular embodiments, environment 100 omits a network management system 112, as shown in FIG. 1B. In this scenario, the rate adaptation, uplink bandwidth measurement, and video bandwidth allocation operations are performed by video sources 110 in a distributed fashion. Video sources 110 may be in communication with each other to coordinate the various operations. As an example, video sources 110 may each include a processor and a memory configured to perform uplink bandwidth measurements, agree on bandwidth allocation and perform rate adaptations. Video sources may communicate with each other over network 150 (like shown in FIG. 1A) or communicate over another network 152 (as shown in FIG. 1B). Network 152 may be any suitable communications network such as, by way of example, a LAN, a WAN, an ad-hoc wireless network, etc.

Figure 2A:
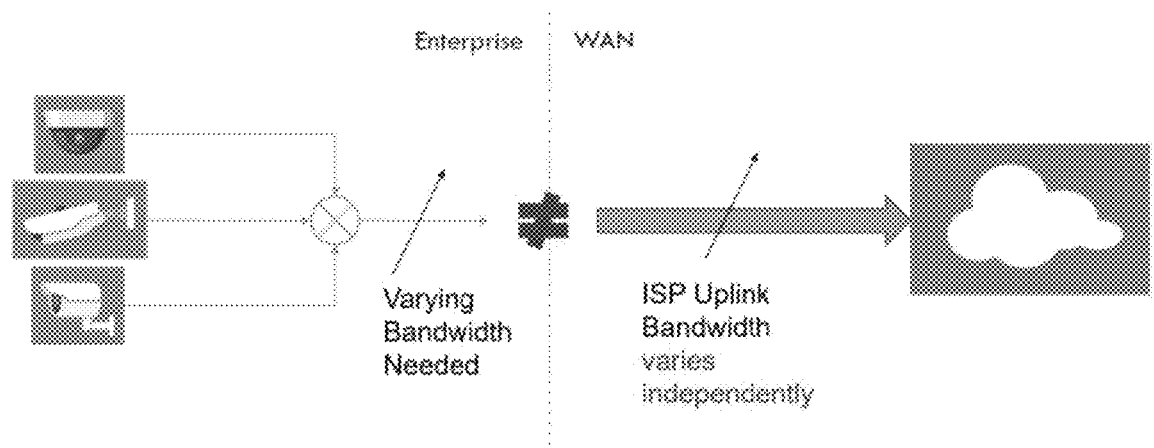
FIG. 2A is a schematic diagram that illustrates the high-level problem of mismatch between the bandwidth needed by video sources and the available uplink bandwidth.
Figure 2B:
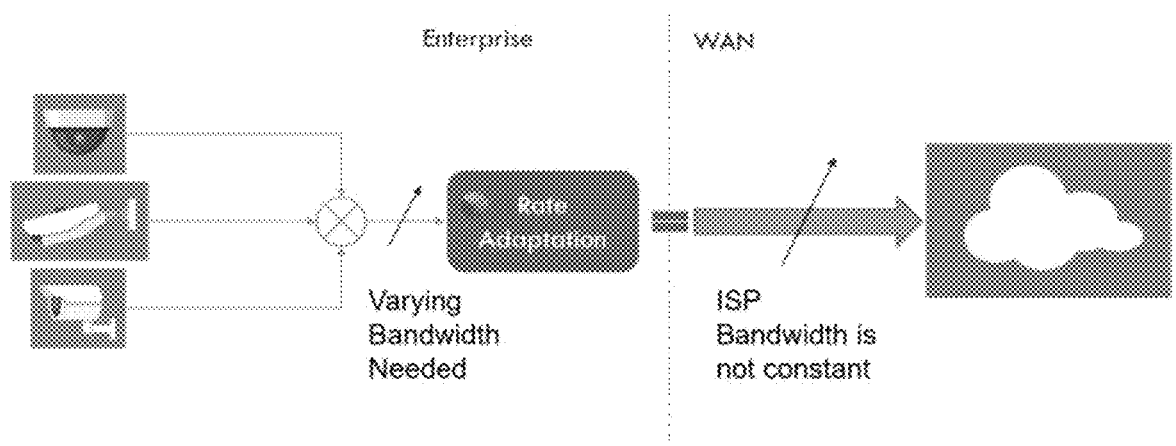
FIG. 2B is a schematic diagram illustrating rate adaptation performed at the source network in order to dynamically adjust the bitrates of video sources so as to improve the video quality while avoiding dropped packets and missing video segments.

FIG. 2A illustrates the high-level problem of mismatch between the bandwidth needed by video sources and the available uplink bandwidth. Again, video sources 110 may comprise a heterogenous collection of video recording devices with independently configurable bitrate and different scene content (due to different positioning), which causes each video source 110 to have different and variable bandwidth requirements. The available uplink bandwidth may be provided by an Internet Service Provider (ISP). As such, this bandwidth will also vary independently over time, for example, depending on time of day and overall network usage by other parties. FIG. 2B illustrates rate adaptation may be performed at the source network in order to dynamically adjust the bitrates of video sources 110 so as to improve the video quality while avoiding dropped packets and missing video segments.

Figure 3:
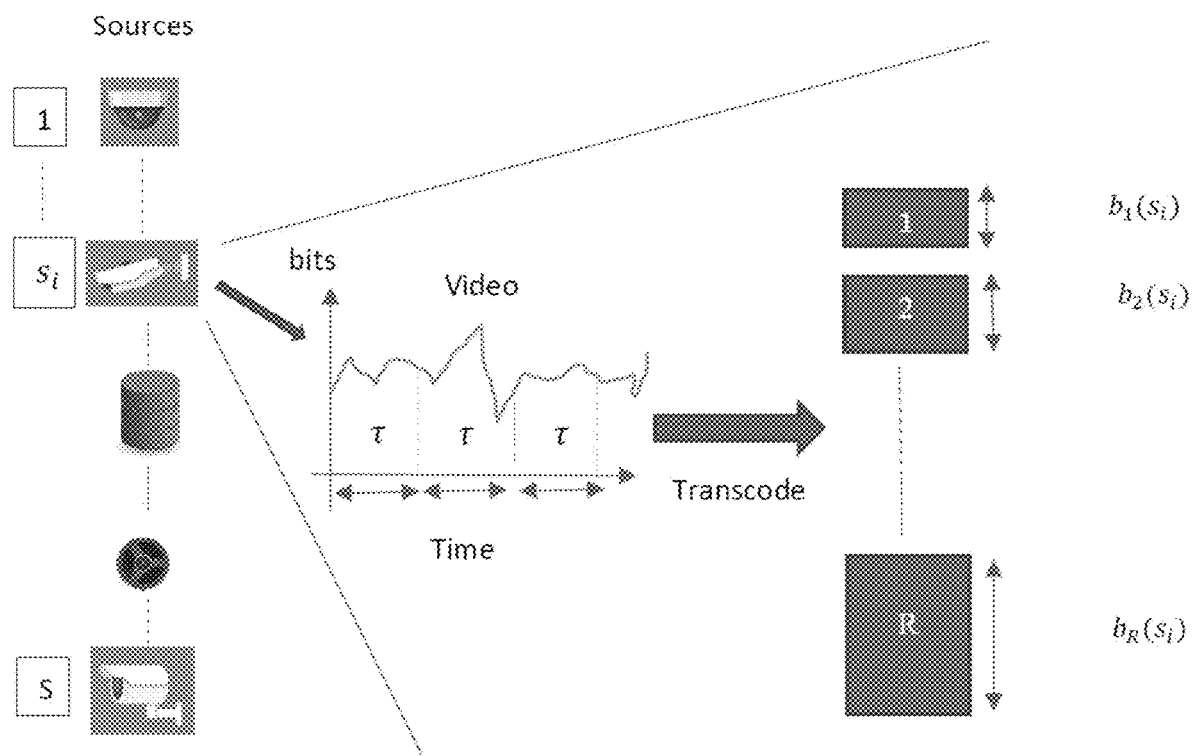
FIG. 3 is a schematic diagram illustrating the setup of video sources and data examples according to another embodiment.

FIG. 3 illustrates the setup of video sources 110 and data segments, according to an example embodiment. The following paragraphs introduce a nomenclature for describing embodiments of the methods for rate adaptation described throughout the rest of the disclosure.

In a system 100 setup there are N video sources (e.g., cameras, storage media, device, software application, etc.), labelled $\{s_1, \ldots, s_i, \ldots s_N\}$. Each video source 110 may have a preset resolution, frame rate and codec type parameters, for example, setup by a user for each camera during camera set up. To reduce re-buffering during playback from the cloud, video from each source stream is divided into slices of time $\tau$.

In particular embodiments, video from each slice of each source may be independently encoded into any of R block types $\{1, 2, \ldots, r, \ldots, R\}$, each with a different size, and thus quality. Each block type comprises one of a set of video encode formats that may be selected, each of these formats having a frame rate, resolution, encoding quality, bitrate. As an example, a first block type may have a frame rate of 20 frames-per-second (fps), resolution of 1024×768, encoding quality set to Medium, and a bitrate of 128 kbps, while a second block size may have 30 fps, 1920×1080 resolution, encoding quality set to High, and bitrate of 256 kbps. The set of block types may comprise a standard set widely used for online video streaming by cloud video providers.

The possible sizes in bits, of encoded blocks generated for source $s_i$, in slice n (i.e. between $((n-1)\tau \leq t \leq n\tau)$ are denoted by $b_r(s_i, n) \in \{b_1(s_i, n), \ldots, b_r(s_i, n), \ldots, b_R(s_i, n)\}$ bits. The rate adaptation processes assume constant bit rate encoding, i.e., $b_1(s_i, n) \approx b_1(s_i)$. However, particular embodiments may include constant bitrate encodings, variable bitrate encodings, or any combination thereof. As such, the assumption of constant bitrate encoding throughout the process may be an approximation.

Blocks may be defined so that $b_x(s_i) > b_y(s_i)$ if $x > y$. Implies block x is higher quality than block y. A vector $b(s_i)$ is defined comprising all transcoding block sizes for source $s_i$, as $$b(s_i) = \begin{bmatrix} b_1(s_i) \\ \vdots \\ b_R(s_i) \end{bmatrix}$$

Figure 4:
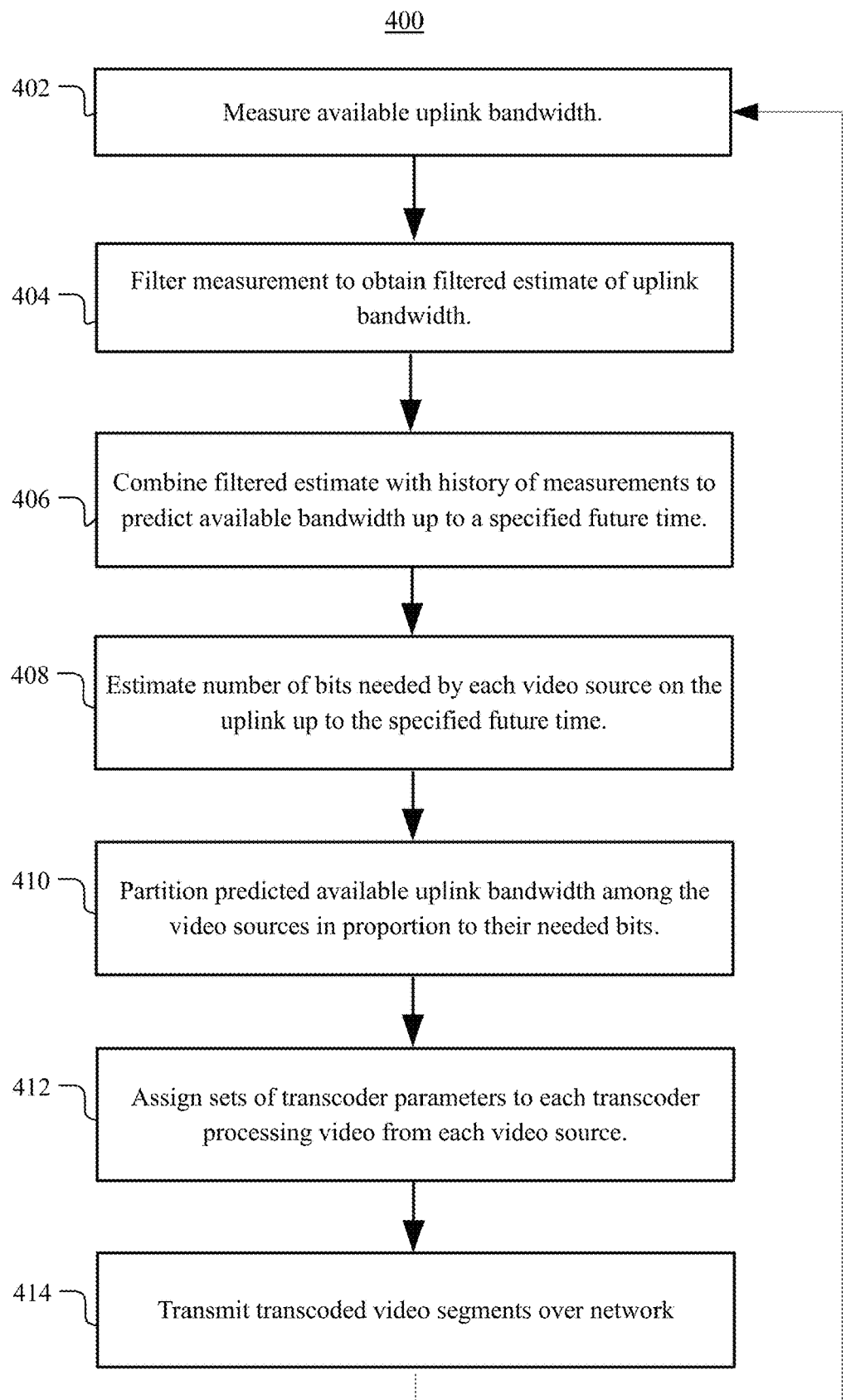
FIG. 4 is a flow chart for a method rate adaptation based on available uplink bandwidth, according to another embodiment.
Figure 7:
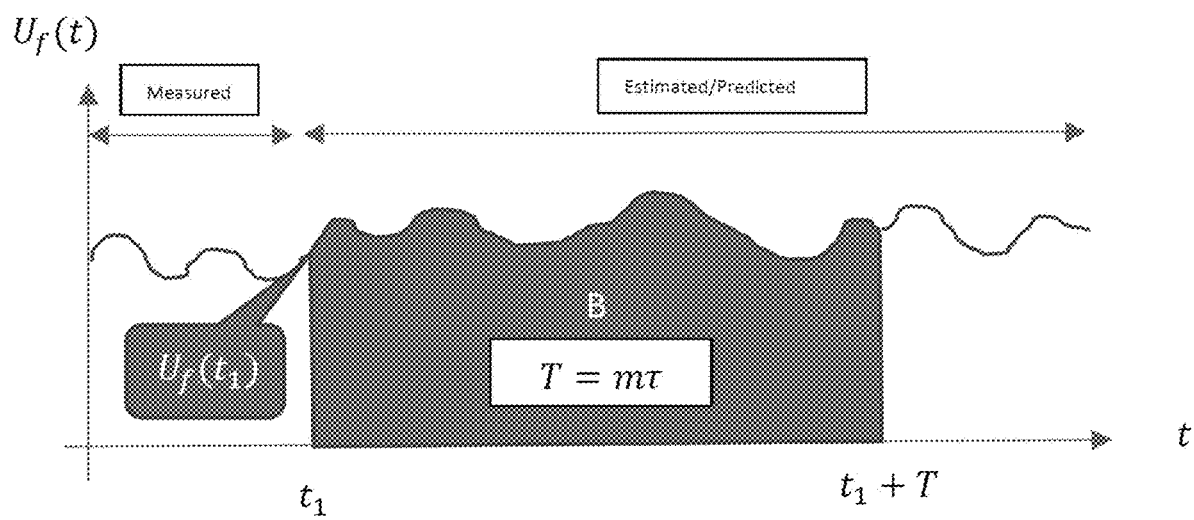
FIG. 7 is a schematic diagram that illustrate that the method of FIG. 4 being performed by NMS 112, video sources 110 in communication with each other, or any combination thereof. Steps 402-406 involve estimating the number of bits (i.e., bandwidth) available on the uplink up to a time $T=m\tau$ seconds away, where m is a tunable system parameter representing the number of time slices for which bandwidth availability estimation and prediction will be performed, and is a positive real number.

In view of the above setup, network management system 112, video sources 110, or a combination thereof, may perform a method for rate adaptation based on available uplink bandwidth. FIG. 4 shows a flowchart for a method 400 rate adaptation based on available uplink bandwidth, according to particular embodiments. As mentioned above, method 400 may be performed by NMS 112, video sources 110 in communication with each other, or any combination thereof. Steps 402-406 involve estimating the number of bits (i.e., bandwidth) available on the uplink up to a time $T=m\tau$ seconds away, where m is a tunable system parameter representing the number of time slices for which bandwidth availability estimation and prediction will be performed, and is a positive real number. This is illustrated in FIG. 7. At step 402, the uplink bandwidth at a present time is obtained. The bandwidth may be directly measured by one or more video sources 110 and/or NMS 112, or may be retrieved from a separate equipment or application. This bandwidth is denoted as $U(t_1)$ bits/s, where $t_1$ is the time of measurement. At step 404, this measurement is filtered to obtain a filtered estimate of uplink bandwidth, denoted by $U_f(t_1)$. Such a filter could be, for example, a weighted moving average filter over previous measurements $U_f(t_1-k\delta T)$ where $\delta T$ is the interval between successive measurements and k is an integer >0.

As explained above, in particular embodiments the value of T is a tunable system parameter. Large values of T may make the rate adaptation look into the future and thus make it less reactive to short term uplink variations. Such a scheme, for example, could know that the link is expected to improve in the future and thus not reduce the quality of video uploaded in response to short term uplink congestion. On the other hand, this may increase the latency of upload and necessitate larger local storage requirements. The choice of a value for T could depend on customer latency requirements and storage budgets.

At step 406, $U_f(t_1)$ is combined with a history of such bandwidth measurements to capture time variations of available uplink bitrates. In particular embodiments, combining comprise, as an example, computing a weighted moving average filter that uses $U_f(t_1)$, along with $U_f(t_1-kT_\Delta)$, where k is an integer >0, and $T\Delta$ is a time interval that corresponds to a user defined interval, e.g., a one hour period, 24 hour period, one week period, day of the month, date of the year, etc. Using the above measurements and estimates, or by using information from other equipment or software, the system estimates the total number of bits available on the uplink up to a future time T away. This is denoted herein as B bits. It should be noted that while T is referred to as measured in seconds in this disclosure, the range of T may be as large as minutes, hours, days, or more. Also, the estimate for the total number of bits available on the uplink could also be obtained by other techniques such as Machine Learning, Deep Learning, or Artificial Intelligence.

At step 408, the system estimates the number of bits needed by a video source on the uplink up to a time T away. For each video source i, the system estimates the bitrate needed as $c_i(t_1)$ bits/s. In particular embodiments, this number of bits is computed by measuring the encoded bit rate coming out of the video source (e.g., camera). In particular embodiments, the number of bits is obtained directly from a video source 110 that provides it. In particular embodiments, $c_i(t_1)$ is combined with its history to capture time variations. As an example, the bitrate can be computed through a weighted moving average filter that uses $c_i(t_1)$, along with $c_i(t_1-k\rho_\Delta)$, where k is an integer>0, and $\rho_\Delta$ is a time interval that corresponds to a predefined interval, e.g., one-hour period, 24 hour period, one week period, day of the month, date of the year, etc. Also, the estimate for the total number of bits needed by a source could also be obtained by other techniques such as Machine Learning, Deep Learning, or Artificial Intelligence.

In particular embodiments, the system estimates the number of bits needed by a video source by computing the un-encoded bitrate based on the preconfigured camera parameters for a stream.

In this manner, the number of bits needed by video source i up to a future time T away is estimated. This value is denoted as $C_{i_{total}}$ herein.

In particular embodiments, video source 100 may be a storage source. In this scenario, $C_{i_{total}}$ is the number stored bits that need to be sent on the uplink up to future time T away. Such a source could store, for example, archived video, or video that could not be sent during uplink outages.

In particular embodiments, step 408 is omitted and the uplink bandwidth is allocated among video sources 110 in a user-defined manner (e.g., equal allocation, etc.), instead of as described in step 410 below.

At step 410, the available uplink bits are partitioned among the video sources 110 in proportion of the bits needed by each source. In particular embodiments, the uplink bit allocation for a source i, $B(s_i)$, is computed as:

$$B(s_i) = B * \frac{C_{i_{total}}}{\sum_{j=1}^{N} C_{j_{total}}} \text{bits}$$

$$\text{Note: } \sum_{i=1}^{N} B(s_i) = B$$

The target bit rate for each source as is then computed based on the sources assigned partition:

$$Q(s_i) = \frac{B(s_i)}{T}$$

At step 412, the system assigns a set of encoder parameters to each encoder processing video from each video source. In particular embodiments, the system first checks whether, for each video source $s_i$, a set of encoder parameters (frame rate, resolution, encoder, etc.) exists that can be used by an encoder to ingest video from source $s_i$ and produce output video of an acceptable quality at the corresponding target bitrate $Q(s_i)$. If such a set of parameters exist, the system programs an encoder to use this set, and then this encoder is used to process video from source $s_i$.

Figure 9:
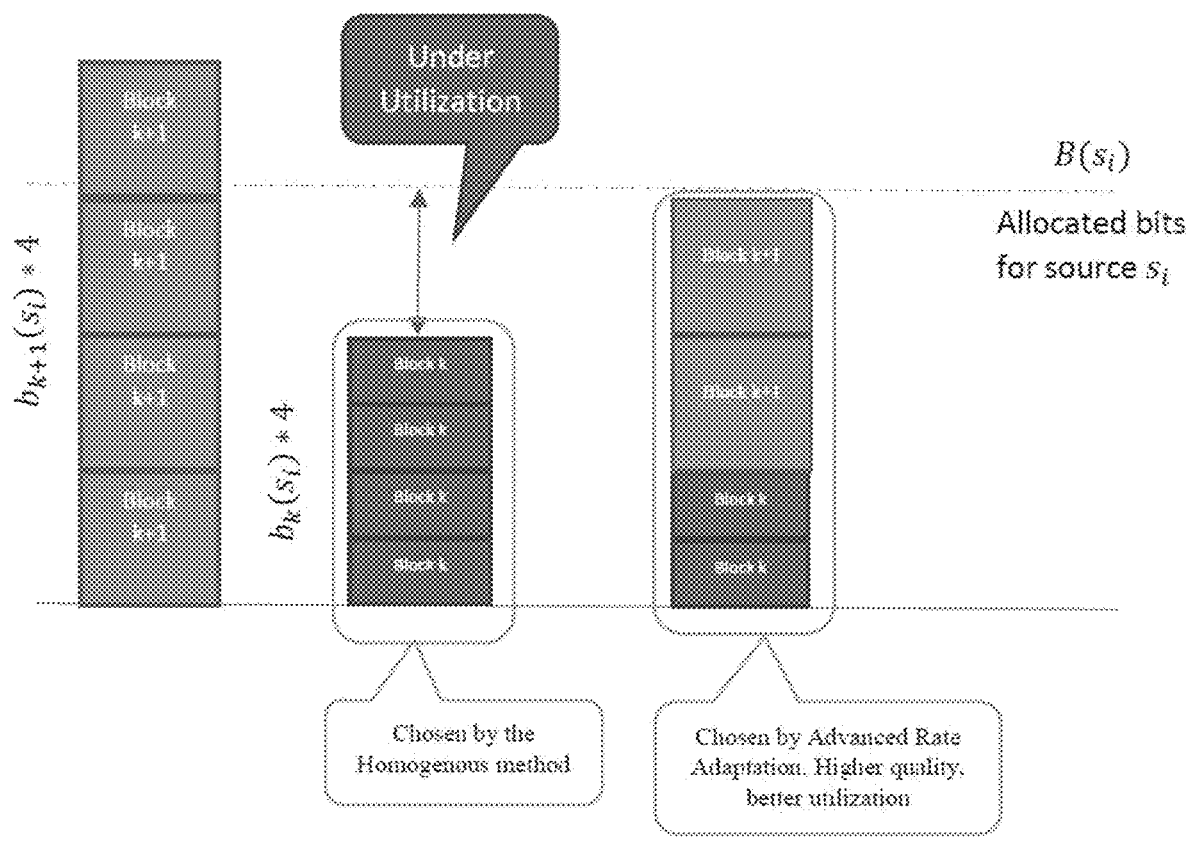
FIG. 9 is a schematic diagram that illustrates the difference in encoder block settings for each method of allocation.

In particular embodiments, if an appropriate set of encoder parameters does not exist, the system may use preset encode block settings for each video source 110. In particular embodiments, the preset encode block settings may be selected using a homogenous allocation or a heterogenous allocation. FIG. 9 illustrates the difference in encoder block settings for each method of allocation.

When using homogenous allocation, the system may find the largest k, such that $b_k(s_i) \leq B(s_i)/m$. That is, the system finds the block index k that results in the largest bitrate that is below the allocated bitrate for the video source. This choice is denoted as k* herein. If, for a video source i, a newly computed bitrate allocation differs from the previous allocation, video source i or a encoder/other software sourcing video source i's stream is reprogrammed with encoding parameters that correspond to the encode block.

When using heterogenous allocation of bandwidth, an advanced rate adaptation algorithm (explained below) is used that chooses different block sizes for each video source, thus improving quality and bandwidth capacity utilization, as illustrated in FIG. 9. The advanced rate adaptation algorithm returns a vector $K(s_i)$ that contains the total number of times each encoded block of type r needs to be selected for transmission, up to a future time T away.

$$K(s_i) = \begin{bmatrix} K_1(s_i) \\ \vdots \\ K_R(s_i) \end{bmatrix}$$

Once vector $K(s_i)$ has been computed, video sources 110 and/or their corresponding encoders can be reprogrammed to produce the number of encoder blocks of types indicated in $K(s_i)$. As an example, vector $K(s_i)$ may indicate that over the next m time slices, a video source 110 should transmit two blocks having a frame rate of 20 frames-per-second (fps), resolution of 1024×768, encoding quality set to Medium, and a bitrate of 128 kbps, and two more blocks having 30 fps, 1920×1080 resolution, encoding quality set to High, and bitrate of 256 kbps. By having blocks with different encoding parameters the system can achieve high quality and higher utilization, as illustrated in FIG. 9.

At step 414, the appropriately encoded video segments are transmitted over the network 150, and the steps are repeated over the lifetime or other desired portion of the streams. In this manner, the video streams are constantly and dynamically adjusted in bitrate based on variable uplink bandwidth availability and video source content size.

In particular embodiments, a video source 110 produces multiple video streams. As an example, a video source 110 may produce multiple streams with each stream having a unique parameter set (e.g., resolution, bit rate, frame rate, quality, etc.) In another example, the video source 110 uses scalable video coding (SVC), where each stream could be a hierarchical layered composite. The composite may consist of a base layer stream providing a lower quality, and additional streams adding incremental quality layers. As such, each layer improves the quality of the stream by adding information. In particular embodiments, each possible composite is treated to be a separate stream. For, example the base layer and the first layer is treated as one composite stream while the base layer along with the first two layers is treated as a different composite stream.

Figure 5:
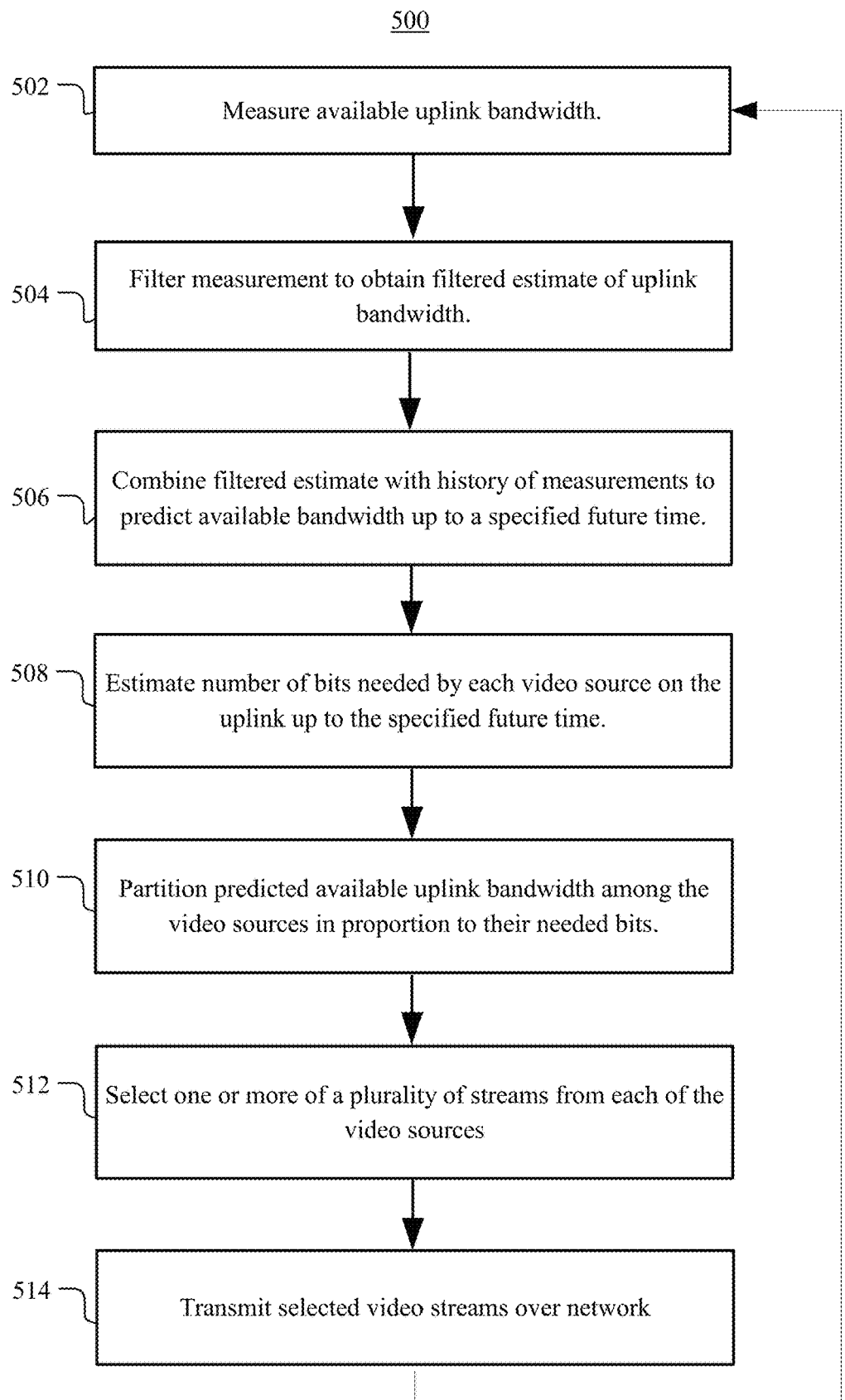
FIG. 5 is a flowchart for a method rate adaptation based on available uplink bandwidth where each video source produces multiple video streams, according to another embodiment.

FIG. 5 shows a flowchart for a method 500 rate adaptation based on available uplink bandwidth where each video source produces multiple video streams, according to particular embodiments. In this scenario, instead of assigning a set of parameters as described above in step 412, the system may select which subset of the multiple video streams should be chosen for transmission, as shown in step 512 of FIG. 5. At step 514, the system transmits the selected stream. Steps 502, 504, 506, and 508 may be analogous to steps 402, 404, 406, and 408 explained above. In particular embodiments both methods may be performed concurrently, for example, where some video sources 110 produce a single stream and others multiple streams in the same network.

Figure 6:
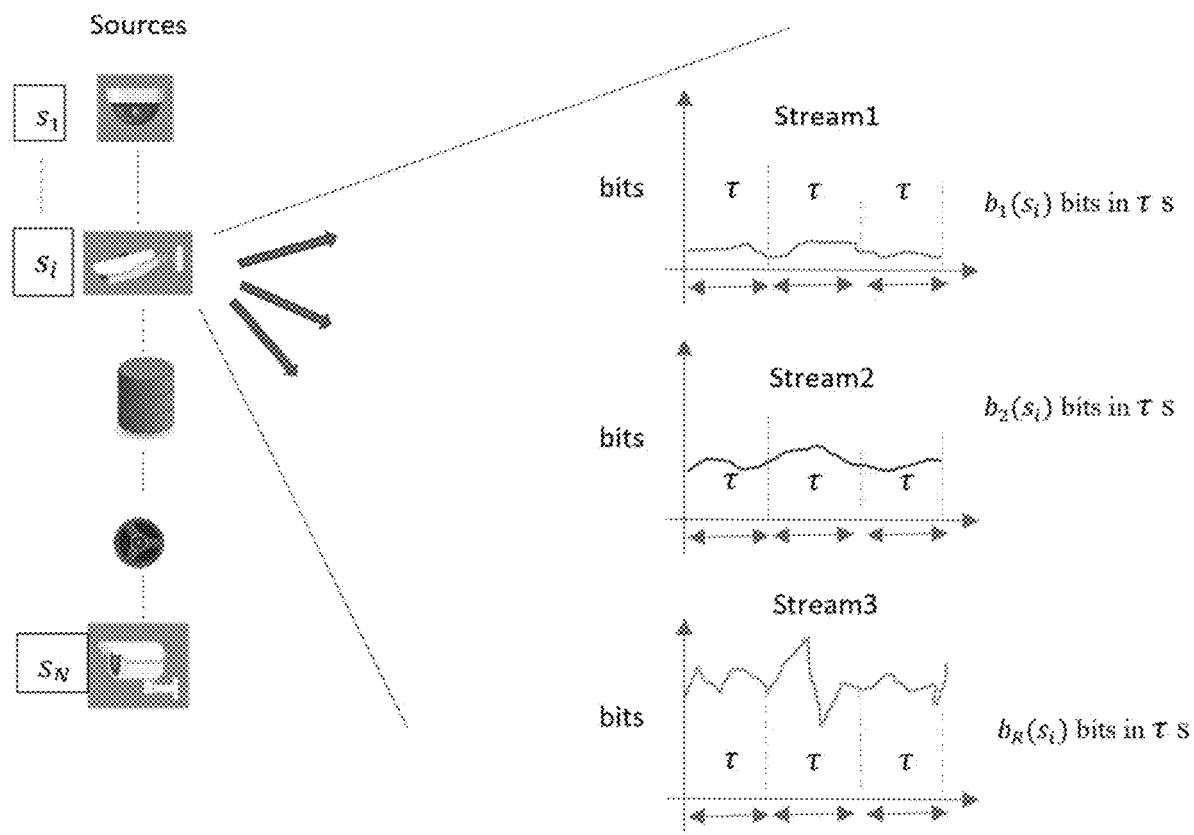
FIG. 6 is a schematic diagram that in the multiple stream scenario the elements of size vector $b(s_i)$ each represent the number of bits needed by the indexed stream from the source $s_i$ over $\tau$ seconds.
Figure 8:
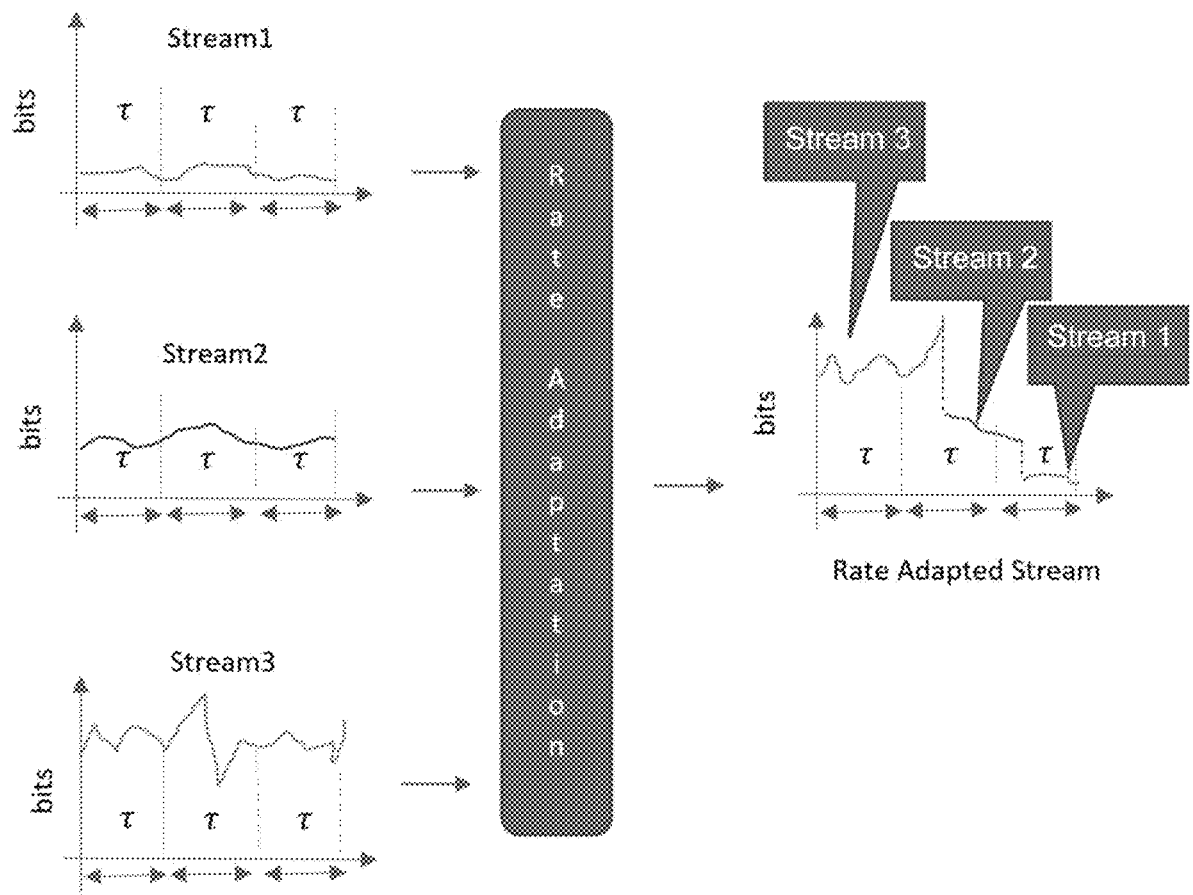
FIG. 8 is a schematic diagram that illustrates the heterogenous allocation of bit rates by selecting corresponding streams from a multiple stream video source.

Under this multiple stream scenario, if video source 110 produces a stream that uses the same bit rate the source's target bit rate $Q(s_i)$) then the system transmits that stream. Otherwise, we again use either a homogenous or heterogeneous allocation of bit rate. With a homogenous allocation, the system transmits the stream whose bit rate requirements are less than and closest to $Q(s_i)$. With a heterogenous allocation, again the advanced rate adaptation algorithm is used to generate the vector $K(s_i)$, with each element of the vector indexing a stream choice $\{1, 2, \ldots, r, \ldots, R\}$ in the multiple stream scenario. FIG. 8 illustrates the heterogenous allocation of bit rates by selecting corresponding streams from a multiple stream video source 110. The value of each element in vector $K(s_i)$ is the number of time slices $\tau$ for which each particular stream from the video source 110 should be chosen for transmission. Furthermore, in the multiple stream scenario the elements of size vector $b(s_i)$ each represent the number of bits needed by the indexed stream from the source $s_i$ over $\tau$ seconds, as shown in FIG. 6. For streams in which the number of bits over $\tau$ seconds is not constant, the value may be an estimate (e.g., mean).

The following paragraphs describe the advanced rate adaptation algorithm that was referred to above. In particular embodiments, the advanced rate adaptation algorithm aims at maximizing uplink utilization in the transmit time interval for each video source 110. This can be done by minimizing the following objective function with respect to $K(s_i)$:

$$(b^t(s_i)K(s_i)-B(s_i))^{t*}(b^t(s_i)K(s_i)-B(s_i))$$

At the same time, the algorithm aims to favor higher quality encode parameter block choices by favoring larger blocks over smaller blocks. This can be achieved by minimizing the following objective function with respect to $K(s_i)$, where the weights w are a decreasing function of the block index, and where a larger index indicates a higher quality block:

$$(w^t K(s_i))^t(w^t K(s_i)) = K^t(s_i) w w^t K(s_i)$$

By thus defining the weights, the algorithm penalizes choices of low quality blocks.

$$w = \begin{bmatrix} w_1 \\ \vdots \\ w_R \end{bmatrix}$$

$$w_1 > w_2 > \ldots > w_R \geq 0$$

If block type k* is the optimum homogenous type that can be chosen, as specified above, the algorithm can set $w_x$=large number, for x<k*.

Therefore, the advanced rate adaptation algorithm aims to minimize the objective function with respect to $K(s_i)$:

$$f(K(s_i)) = [(b^t(s_i)K(s_i)-B(s_i))^{t*}(b^t(s_i)K(s_i))-B(s_i)) + \alpha K^t(s_i) w w^t K(s_i)]$$

where the left side of the summation is aimed at maximizing channel utilization, and the right side at favoring higher quality blocks. The constant $\alpha$ is a tunable system design parameter that can be used to adjust the tradeoff between channel utilization maximization and video quality.

The objective function may have the following constraints:

Every element of the solution should be greater than or equal to zero, since negative block numbers don't make sense.

$$K(s_i) \succcurlyeq 0$$

The notation $\succcurlyeq$ says that the inequality is valid of each element of the vector.

The number of slices that need to be dispatched for each source is fixed.

$$\sum_{r=1}^{R} K_r(s_i) = m_i$$

$$1^t K(s_i) = m_i$$

For live stream video sources, it may be ideal to dispatch all new video captured up to future time T. As such: $m_i = m$ for all camera livestream sources.

For storage video sources, this may be the number of slices $m_i^*$ of stored video that is budgeted to be dispatched up to future time T.

In particular embodiments, to compute a solution to the objective function, the function can be reworked and summarized as follows:

Minimize $f(K(s_i)) = [K^t(s_i)(b(s_i)b^t(s_i) + \alpha ww^t)K(s_i) - 2B(s_i)b^t(s_i)K(s_i) + B^2(s_i)]$ With $-K(s_i) \leq 0$ And $1^t K(s_i) = m_i$ Where the $\leq$ the constraint holds for each element of the vector.

Using the log-barrier method to encode the inequality constraint into the objective, we get:

With $1^t K(s_i) = m_i$

In the above, $\rho$ controls the quality of approximation of the log-barrier to the ideal inequality barrier. Larger values approximate ideal behavior better. As component of $K_r(s_i)$ approaches 0, the objective shoots up, creating a barrier. Note that the log barrier is also convex.

In particular embodiments, Newton's method can be used to compute a solution. Starting from a value of $K(s_i)$ that already satisfies $1^t K(s_i) = m_i$ we get the Newton step $\Delta K(s_i)$ as the solution to:

$$\begin{bmatrix} \nabla^2 f(K(s_i)) & 1 \\ 1^t & 0 \end{bmatrix} \begin{bmatrix} \Delta K(s_i) \\ v \end{bmatrix} = -\begin{bmatrix} \nabla f(K(s_i)) \\ 0 \end{bmatrix}$$

where v is a Lagrange multiplier. This can be reworked to:

$$\begin{bmatrix} 2(b(s_i)b^t(s_i) + \alpha ww^t) - \frac{1}{\rho} \begin{bmatrix} -\frac{1}{K_1^2(s_1)} & \cdots & 0 \\ \vdots & \ddots & \vdots \\ 0 & \cdots & -\frac{1}{K_R^2(s_1)} \end{bmatrix} & 1 \\ 1^t & 0 \end{bmatrix}$$

$$\begin{bmatrix} \Delta K(s_i) \\ v \end{bmatrix} =$$

$$-\begin{bmatrix} 2(b(s_i)b^t(s_i) + \alpha ww^t)K(s_i) - 2B(s_i)b(s_i)b(s_i) - \frac{1}{\rho} \begin{bmatrix} \frac{1}{K_1(s_1)} \\ \vdots \\ \frac{1}{K_R(s_1)} \end{bmatrix} \\ 0 \end{bmatrix}$$

The Newton step value assumes that the objective is quadratic, so using this value to update $K(s_i)$ may lead us to a point that does not satisfy the original inequality constraint. As such, computation may move in the direction of the Newton step using a back-trace line search, until convergence.

Figure 10:
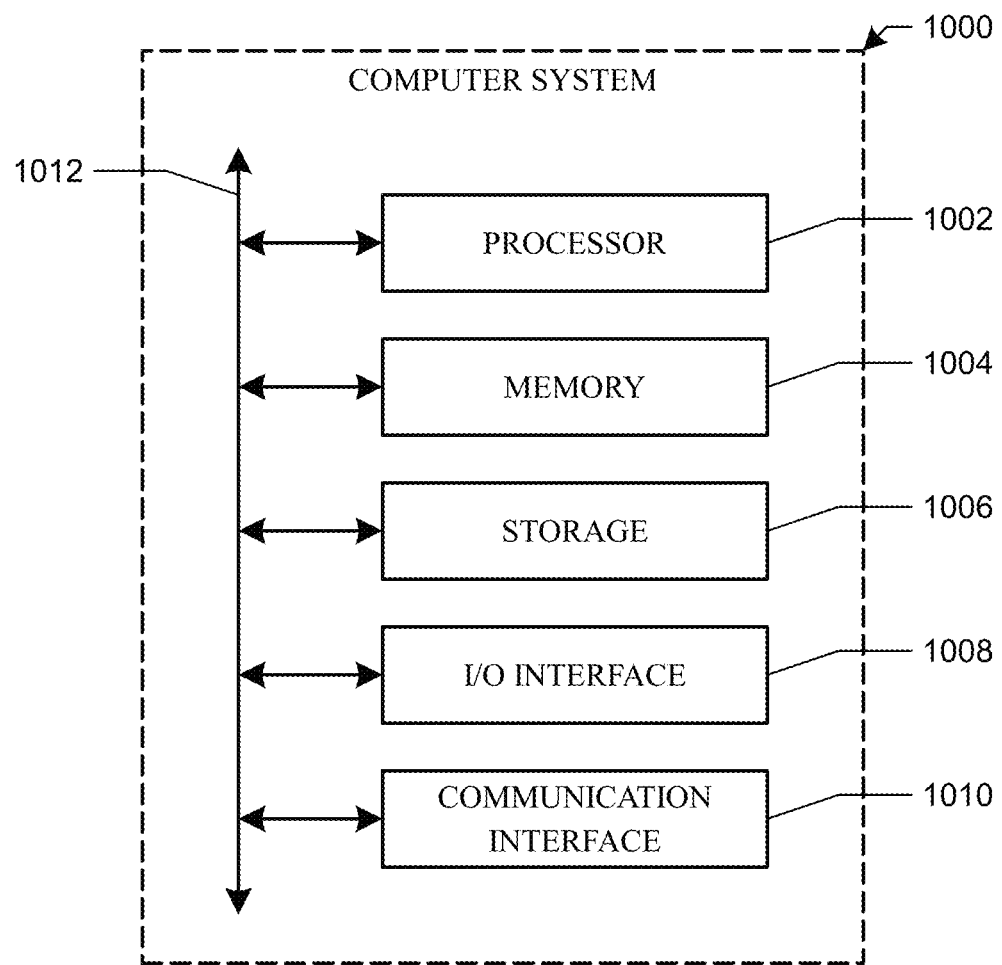
FIG. 10 is a block diagram that illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example, computer system 1000 may be an embedded computer system, a desktop computer system, a laptop or notebook computer system, a mainframe, a mobile telephone, a personal digital assistant (PDA), a server, a tablet computer system, a security camera, a storage device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate. Also, the parameter computation may be done on a separate device that commands the sources to produce streams with the computed parameters.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, memory 1004 includes random access memory (RAM). This RAM may be volatile memory, where appropriate Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In many cases, video produced by a set of sources needs to be transferred to multiple locations in parallel. Such locations could be, one or more remote storage locations, one or more remote video viewers. For example, one location may be to the cloud for storage, and another location may be to a live viewer. Even though all outgoing video may initially share the same up-link, the speeds to each destination will be different because they are different points on the network/internet. So, the disclosed method will need to be applied simultaneously to each such destination, considering the bandwidth for each. Each source may have a separate stream per destination.

Outbound video to these destinations could share the same network/internet link or could have independent links. In both cases, since destinations are potentially at different points on the network/internet, the measured uplink bandwidth is dependent on the destination.

Because of this, to maximize video quality to each destination, it is necessary to obtain separate bandwidth measurement to each destination. "Obtain" could mean compute or fetch from other devices. Each such measurement must be partitioned among sources in proportion to their demand.

Further, a set of encoding parameters needs to be computed per source per destination based on the partition. Assigning these sets of encoder parameters causes multiple streams to be produced by the same source, one to each destination. As before, the "assigning" of encoder parameters may be achieved in many ways. These ways may include 1) obtaining one or more streams from the source and encoding it, 2) transmitting encoding parameters to the source to command it to encode using these parameters, 3) commanding a third-party encoder to produce streams using these parameters, and 4) a combination of the above methods.

For sources that already produce multiple streams, the computed partition for each destination is used to select one or more streams for that destination. Again, this can be combined with the above methods.

Considering multiple destinations, the partition computation described above can be re-stated in (potentially) separate items as follows:

1. Partition available uplink bits per destination d among sources in proportion of the bits needed by each source. The uplink bit allocation for source i, to destination d, (si), is computed as:

$$B_d(s_i) = B_d * \frac{C_{i_{total}}}{\sum_{j=1}^{N} C_{j_{total}}} \text{bits}$$

$$\text{Note: } \sum_{i=1}^{N} B_d(s_i) = B_d$$

Wherein $B_d$ is the total uplink bandwidth available to destination d. All other notation is the same as before.

2. Find the target bit rate for each source, to destination d as $$Q_d(s_i) = \frac{B_d(s_i)}{T}$$

3. The steps and related subject matter disclosed in the above paragraphs starting from the paragraph beginning with "At step 412" to the paragraph beginning with "The Newton step" apply to each destination separately.

4. The steps shown in FIGS. 4 and 5 also apply to each destination.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method comprising, by at least one processor:
   obtaining an estimated available bandwidth on the network communications link over a predetermined period of time, T, in the future based on a measured present bandwidth and historical bandwidth measurements;
   determining estimated required bandwidths for each of one or more of video sources over the predetermined period of time, T, in the future;
   partitioning the calculated estimated available bandwidth among the one or more video sources in proportion to the estimated required bandwidths of each of the one or more video sources;
   choosing an encoded block type from among one or more preset block types, for each of one or more slices of video from each of the one or more video sources, over the time T, to jointly maximize the usage of higher quality block types and the utilization of the assigned bandwidth partition for each source; and
   assigning an individual set of encoder parameters to each slice of video from each of the one or more video sources, over the time T, based on the choice of the encoded block type for the respective slice,
   wherein the assigning of the encoder parameters causes each slice of video from each of the one or more video sources to be transmitted over the network communications link using the assigned set of encoder parameters for the respective slice.

2. The method of claim 1, wherein the obtaining the estimated available bandwidth comprises selecting a lesser of a user input bandwidth and the obtained present bandwidth measurement.

3. The method of claim 1, wherein the partitioning the calculated estimated available bandwidth among the one or more video sources comprises dividing the estimated available bandwidth in a user defined allocation.

4. The method of claim 1, wherein choosing an encoded block type further comprises:
   determining, for each video source $s_i$ of the one or more video sources, a vector $K(s_i)=[K_1(s_i) \ldots K_R(s_i)]$, containing R items, with each item of the vector having values zero or greater, and each item corresponding uniquely to a particular encoded block type r of size $b_r(s_i)$ among one or more possible types R with sizes represented by the vector $b(s_i)=[b_1(s_i) \ldots b_R(s_i)]$, such that the sum of values of the items in $K(s_i)$ is equal to the total number of slices $m_i$ of video over the future period of the time T from the video source $s_i$, where the value of each item in the vector $K(s_i)$ represents the number of times the corresponding encoded block type must be chosen for the slices over the future period of the time T, with the goal of maximizing the usage of the bandwidth partition $B(s_i)$ assigned to the video source $s_i$ while simultaneously maximizing the use of higher quality encoded block types.

5. The method of claim 4, wherein the vector $K(s_i)$ for each video source $s_i$, is determined to be a value that minimizes the objective function $$[(b^t(s_i)K(s_i)-B(s_i))^{t*}(b^t(s_i)K(s_i)-B(s_i))+\alpha K^t(s_i)ww^t K(s_i)];$$

where the entries in vector $w=[w_1 \ldots w_R]$ assign weights to different encoded block types, with lower quality types being assigned higher weights,
and where $\alpha$ is a tradeoff parameter between
   maximizing the usage of the bandwidth partition for source $s_i$, $B(s_i)$ $$(b^t(s_i)K(s_i)-B(s_i))^{t*}(b^t(s_i)K(s_i)-B(s_i))$$

and
   maximizing the usage of high-quality blocks and thus video quality,
   $K^t(s_i)ww^t K(s_i)$; and
where t is a notation for vector transpose.

6. The method of claim 1, wherein determining estimated required bandwidths for each of one or more of video sources over a predetermined period of time in the future is computed through a weighted moving average filter that uses $c_i(t_1)$, along with $c_i(t_1-k\rho_A)$, where k is an integer>0, and $\rho_A$ is a time interval that corresponds to a predefined interval, where $t_1$ is the time of measurement, and where $c_i(t_1)$ is the estimated bitrate in bits/second for each video source at the time $t_1$.

7. The method of claim 1, wherein obtaining an estimated available bandwidth on the network communications link over a predetermined period of time in the future, T, includes computing a weighted moving average filter that uses $U_f(t_1)$, along with $U_f(t_1-kT_A)$, where $U_f(t_1)$ is the measured present bandwidth, where k is an integer>0, where $t_1$ is the time of measurement, and $T_A$ is a time interval that corresponds to a user defined interval.

8. A video surveillance system comprising:
   one or more video sources;
   a network communications link;
   at least one memory configured for storing instructions;
   at least one processor coupled to the memory configured to execute the instructions to perform operations comprising:
      obtaining an estimated available bandwidth on the network communications link over a predetermined period of time, T, in the future based on a measured present bandwidth and historical bandwidth measurements;
      determining estimated required bandwidths for each of one or more of video sources over the predetermined period of time, T, in the future;
      partitioning the calculated estimated available bandwidth among the one or more video sources in proportion to the estimated required bandwidths of each of the one or more video sources;
      choosing an encoded block type from among one or more preset block types, for each of one or more slices of video from each of the one or more video sources, over the time T, to jointly maximize the usage of higher quality block types and the utilization of the assigned bandwidth partition for each source; and
      assigning an individual set of encoder parameters to each slice of video from each video source of the one or more video sources, over the time T, based on the choice of the encoded block type for the respective slice,
      wherein the assigning of the encoder parameters causes each slice of video from each of the one or more video sources to be transmitted over the network communications link using the assigned set of encoder parameters for the respective slice.

9. The video surveillance system of claim 8 further comprising a cloud storage system, wherein the one or more video sources transmits the data over the network communications link to the cloud storage system.

10. The video surveillance system of claim 8, wherein the obtaining the estimated available bandwidth comprises selecting a lesser of a user input bandwidth and the obtained present bandwidth measurement.

11. The video surveillance system of claim 8, wherein the partitioning the calculated estimated available bandwidth among the one or more video sources comprises dividing the available bandwidth in a user defined allocation.

12. The system of claim 8, wherein choosing an encoded block type further comprises: determining, for each video source $s_i$ of the one or more video sources, a vector $K(s_i)=[K_1(s_i) \ldots K_R(s_i)]$, containing R items, with each item of the vector having values zero or greater, and each item corresponding uniquely to a particular encoded block type r of size $b_r(s_i)$ among one or more possible types R with sizes represented by the vector $b(s_i)=[b_1(s_i) \ldots b_R(s_i)]$, such that the sum of values of the items in $K(s_i)$ is equal to the total number of slices $m_i$ of video over the future period of the time T from the source $s_i$, where the value of each item in the vector $K(s_i)$ represents the number of times the corresponding encoded block type must be chosen for the slices over the future period of the time T, with the goal of maximizing the usage of the bandwidth partition $B(s_i)$ assigned to the video source $s_i$ while simultaneously maximizing the use of higher quality encoded block types.

13. The system of claim 12, wherein the vector $K(s_i)$ for each video source $s_i$, is determined to be a value that minimizes the objective function $[(b^t(s_i)K(s_i)-B(s_i))^{t}*(b^t(s_i)K(s_i)-B(s_i))+\alpha K^t(s_i)ww^t K(s_i)];$ where the entries in vector $w=[w_1 \ldots w_R]$ assign weights to different encoded block types, with lower quality types being assigned higher weights, and where $\alpha$ is a a tradeoff parameter between maximizing the usage of the bandwidth partition for source $s_i$, $B(s_i)$ $(b^t(s_i)K(s_i)-B(s_i))^{t}*(b^t(s_i)K(s_i)-B(s_i))$ and maximizing the usage of high-quality blocks and thus video quality, $K^t(s_i)ww^t K(s_i)$; and where t is a notation for vector transpose.

14. The system of claim 8, wherein determining estimated required bandwidths for each of one or more of video sources over a predetermined period of time in the future is computed through a weighted moving average filter that uses $c_i(t_1)$, along with $c_i(t_1-k\rho_A)$, where k is an integer>0, and $\rho_A$ is a time interval that corresponds to a predefined interval, where $t_1$ is the time of measurement, and where $c_i(t_1)$ is the estimated bitrate in bits/second for each video source at the time $t_1$.

15. The system of claim 8, wherein obtaining an estimated available bandwidth on the network communications link over a predetermined period of time in the future, T, includes computing a weighted moving average filter that uses $U_f(t_1)$, along with $U_f(t_1-kT_A)$, wherein $U_f(t_1)$ is the measured present bandwidth, where k is an integer>0, where $t_1$ is the time of measurement, and $T_A$ is a time interval that corresponds to a user defined interval.

* * * * *

UNITED STATES PATENT AND TRADEMARK OFFICE
CERTIFICATE OF CORRECTION

PATENT NO. : 10,965,906 B2
APPLICATION NO. : 16/416153
DATED : March 30, 2021
INVENTOR(S) : Thejaswi Bharadwaj Madapushi Page 1 of 1

It is certified that error appears in the above-identified patent and that said Letters Patent is hereby corrected as shown below:

In the Specification

Column 9, Line 32, after "objective, we get:" insert $$\_\_f(K(s_i)) = [K^t(s_i)(b(s_i)b^t(s_i) + \alpha w w^t) K(s_i) - 2B(s_i) b^t(s_i) K(s_i) + B^2(s_i)$$
$$-\frac{1}{p}\sum_{r=1}^{R} \log(K_r(s_i))]\_\_$$

Column 9, Line 38, changes "p controls" to --$p$ controls--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*